US012748544B2

(12) United States Patent
Raj et al.

(10) Patent No.: US 12,748,544 B2
(45) Date of Patent: Sep. 29, 2026

(54) WRITE DATA PATH FOR HIGH-SPEED TIME-SHARED SERIAL READ WRITE MEMORIES HAVING WRITE MASK

(71) Applicant: QUALCOMM Incorporated, San Diego, CA (US)

(72) Inventors: Pradeep Raj, Bangalore (IN); Richa Gupta, Sri Ganganagar (IN); Rahul Sahu, Bangalore (IN); Sharad Kumar Gupta, Bangalore (IN)

(73) Assignee: QUALCOMM Incorproated, San Diego, CA (US)

( * ) Notice: Subject to any disclaimer, the term of this patent is extended or adjusted under 35 U.S.C. 154(b) by 202 days.

(21) Appl. No.: 18/648,222

(22) Filed: Apr. 26, 2024

(65) Prior Publication Data

US 2025/0335117 A1 Oct. 30, 2025

(51) Int. Cl.
*G11C 16/04* (2006.01)
*G06F 3/06* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC ..... G06F 3/0655; G06F 3/0604; G06F 3/0673
See application file for complete search history.

(56) References Cited

U.S. PATENT DOCUMENTS 10,381,070 B2 * 8/2019 Liaw ..................... G11C 11/412
10,916,275 B1 2/2021 Ghosh et al.
11,004,503 B1 * 5/2021 Gupta ................... G11C 11/419
11,562,786 B2 * 1/2023 Nien ..................... G11C 11/419

OTHER PUBLICATIONS

International Search Report and Written Opinion—PCT/US2025/020452—ISA/EPO—Jun. 24, 2025.

* cited by examiner

*Primary Examiner* — Pho M Luu
(74) *Attorney, Agent, or Firm* — Loza & Loza, LLP

(57) ABSTRACT

A serial read write memory is provided in which a write driver logic circuit controls a write driver to drive the bit lines in a selected column responsive to a binary value of a data in signal during a write operation in which a write mask signal is not asserted. Should the write mask signal be asserted, the write driver logic circuit controls the write driver to charge the bit line in the selected column and then to float the bit lines regardless of the binary value of the data in signal during a write operation.

19 Claims, 8 Drawing Sheets

WRITE DATA PATH FOR HIGH-SPEED TIME-SHARED SERIAL READ WRITE MEMORIES HAVING WRITE MASK

TECHNICAL FIELD

The present application relates generally to memories and, more specifically, to a write data path for a high-speed time-shared serial read write memory having write mask.

BACKGROUND

Modern processors often have multiple cores in which each core may read and write to a memory. Should the various cores have to share a single access port for both read and write operations to a memory, the computing speed may be affected due to collisions between the cores at the common access port. Multi-port memories have thus been developed that have separate read and write ports.

Although the inclusion of separate read and write ports is advantageous with respect to memory access, the access transistors, word line, and bit line(s) for each port increase the memory complexity and demand more die space on the semiconductor die in which the memory is integrated. Pseudo-dual-port (PDP) memories have thus been developed in which a common access port is first treated as a separate read port and then as a separate write port during a single memory clock cycle. Should the read and write operations occur to the same word line, the word line is first asserted for the read operation, discharged, and then asserted for the write operation. This repeated pulsing of the word line may also be denoted as a "double pumped" operation.

SUMMARY

In accordance with an aspect of the disclosure, a serial read write memory is provided that includes: a power supply node for a memory power supply voltage; a first bit line for a first column of bitcells; a first write driver transistor coupled between the first bit line and the power supply node; a second write driver transistor coupled between the first bit line and ground; and a write driver logic circuit configured to drive the first write driver transistor and the second write driver transistor responsive to a data in signal during a write operation in which a write mask signal is not asserted, the write driver logic circuit being further configured to switch on the first write driver transistor and to switch off the second write driver transistor during a first portion of a write operation in which the write mask signal is asserted.

In accordance with another aspect of the disclosure, a method of operation for a serial read write memory is provided that includes: performing a read operation during a first portion of a memory clock cycle; performing a write operation to a selected column from a group of multiplexed columns during a second portion of the memory clock cycle in response to a write mask signal not being asserted; and charging a pair of bit lines in the selected column followed by floating the pair of bit lines during the second portion of the memory clock cycle in response to the write mask signal being asserted.

In accordance with yet another aspect of the disclosure, a serial read write memory is provided that includes: a column of bitcells including a bit line; a first write driver transistor configured to charge the bit line to a power supply voltage in response to an assertion of a first control signal; a second write driver transistor configured to ground the bit line in response to an assertion of a second control signal; and a write driver logic circuit configured to invert a data in signal to form the first control signal and the second control signal during a write operation in which a write mask is not active and to assert the first control signal and to de-assert the second control signal during a first portion of a write operation in which the write mask is active.

These and other advantageous features may be better appreciated through the following detailed description.

BRIEF DESCRIPTION OF THE DRAWINGS

Implementations of the present disclosure and their advantages are best understood by referring to the detailed description that follows. It should be appreciated that like reference numerals are used to identify like elements illustrated in one or more of the figures.

DETAILED DESCRIPTION

Figure 1:
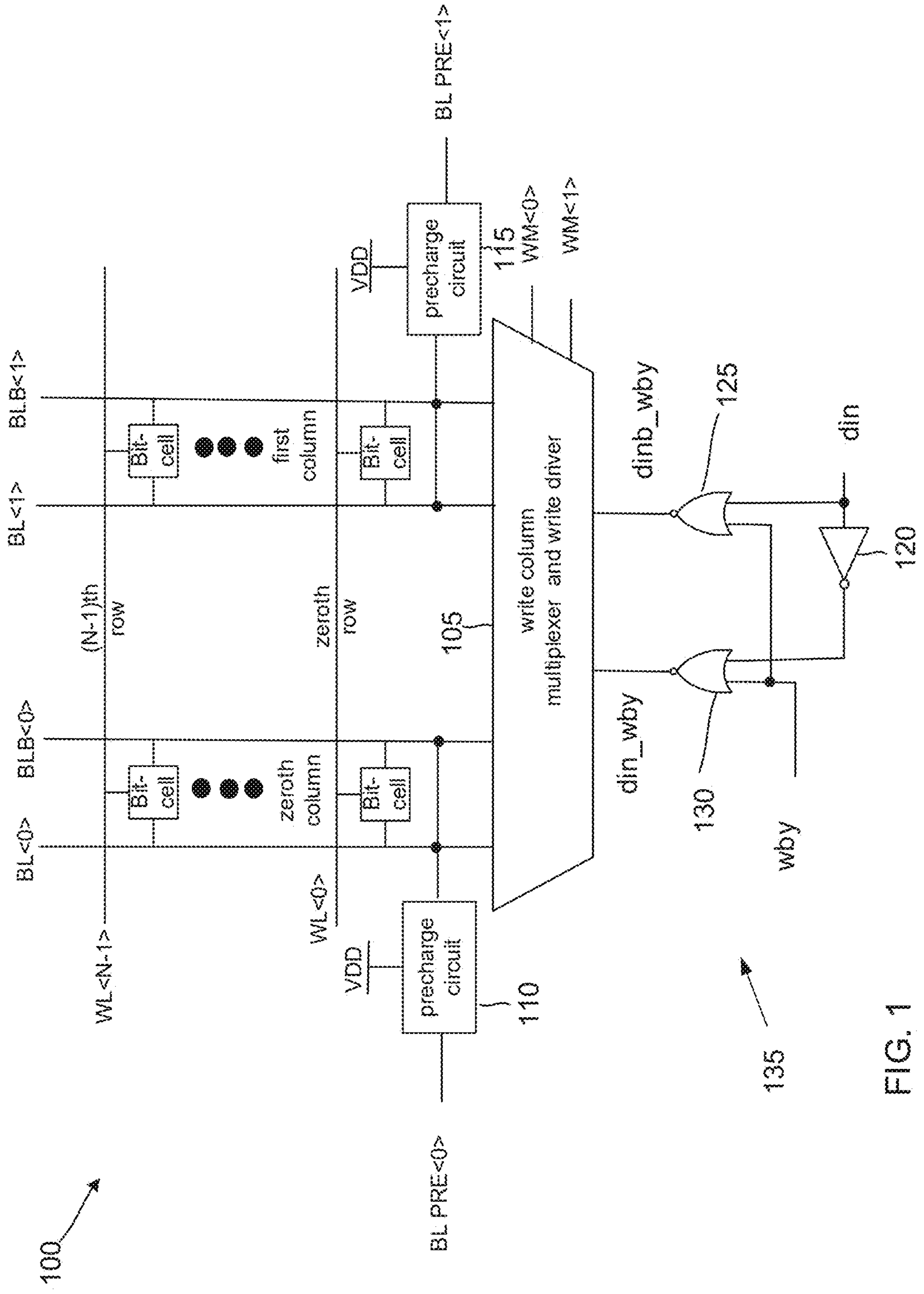
FIG. 1 illustrates a time-shared serial read write memory that is not compatible with write mask in accordance with an aspect of the disclosure.

A write path for a high-speed serial read write memories with write mask is disclosed. Before discussing this write path in more detail, some memory concepts will first be discussed. A memory such as a static random-access memory (SRAM) typically includes many bitcells that are arranged into rows and columns. A word line traverses each row of bitcells. Similarly, a pair of bit lines traverses each column of bitcells. Should the rows and columns be organized into a single array, the corresponding word line and bit lines become relatively long, which increases capacitance and can slow memory operation. It is thus traditional for the bitcells to be organized into banks, each bank having its own columns and rows. Should the bitcells in each bank be pseudo-dual-port bitcells, the resulting memory may be referred to as a serial read write memory in that a read operation is followed by a write operation in a single memory clock cycle.

During the read operation, sense amplifiers sense the voltage differences to read the binary contents stored in the accessed bitcells. Each sense amplifier occupies a certain amount of space on the semiconductor die. With respect to the integration of the memory into the semiconductor die, the columns are spaced apart from each other according to a column pitch that may be too small to accommodate a sense amplifier. It is thus traditional that the columns are arranged into multiplexed groups, with each group of columns being multiplexed by a corresponding read column multiplexer and a corresponding write column multiplexer. The number of columns multiplexed by each read column multiplexer (MUX) and each write column multiplexer depends upon the implementation. For example, in a "MUX2" memory, each column multiplexer selects from a group of two columns. Similarly, each column multiplexer selects from a group of four columns in a "MUX4" memory, and so on. For simplicity, the following discussion will be directed to a MUX2 implementation in which each column multiplexer selects from a group of two columns. However, it will be appreciated that other magnitudes of column multiplexing may be used in alternative implementations of the high-speed serial read write memories with write mask disclosed herein.

The column selected by a write column multiplexer is denoted herein as a selected column. The remaining columns that could have been selected by the write column multiplexer are denoted herein as unselected columns. In a write operation to a MUX2 serial read write memory bank, there is thus one selected column and one unselected column for each write column multiplexer. Similarly, there is one selected column and three unselected columns for each write column multiplexer in a write operation to a MUX4 serial read write memory bank. Regardless of the magnitude of the column multiplexing, a "serial read write memory" is defined herein as a memory in which a read operation to a bank may be followed by a write operation to the bank during a single memory clock cycle. A "time-shared serial read write memory" is defined herein to be a serial read write memory in which the write operation to the selected column occurs in parallel with the pre-charging of the unselected columns following a read operation. The writing to the selected column in parallel with the pre-charging of the unselected columns may also be denoted as a high-speed serial read write operation. Although a time-shared serial read write operation advantageously increases the memory operating speed and reduces power consumption, an issue arises when a write mask is active.

The assertion of a write mask control signal controls whether a write mask is active. Should the write mask be active, a write operation to specific bitcells within the memory array is selectively disabled. Each bit in a write mask control signal may be associated with a corresponding bit in the data being written. If a bit in the write mask control signal is set to one binary value (e.g., a binary zero), the corresponding bit in the data will be written into the corresponding SRAM bitcell. Conversely, if the bit in the write mask control signal is set to the complementary binary value (e.g., a binary one), the corresponding bit in the data is not written into the corresponding SRAM bitcell despite the bitcell being addressed during the write operation. Although write masking increases efficiency and minimizes power consumption in certain memory access scenarios, a problem arises when write masking is active in a time-shared serial read write operation.

This problem may be better appreciated through a consideration of an example multiplexed group of columns 100 for a bank in a time-shared serial read write memory as shown in FIG. 1. It will be appreciated that a memory bank in the time-shared serial read write memory may include a plurality of such multiplexed group of columns but just one multiplexed group of columns 100 is shown in FIG. 1 for illustration clarity. In this example, the memory is a "MUX2" memory in which the multiplexed group of columns 100 includes just two columns, namely, a zeroth column and a first column. Although the multiplexed group of columns 100 is for a MUX2 memory, it will be appreciated that a greater number of columns (e.g., 4 or 8) may be used in alternative implementations. A bit line BL<0> and its complement BLB<0> traverses the zeroth column of bitcells. Similarly, a bit line BL<1> and its complement BLB<1> traverses the first column of bitcells. A write column multiplexer and write driver 105 selects for a write selected one of the columns during a write operation. For brevity, the write column multiplexer and write driver 105 is referred to simply as a write column multiplexer 105 in the following discussion. The write column multiplexer 105 responds to an assertion of a write mux 1 signal WM<1> to select for the first column in the write operation. Conversely, the write column multiplexer 105 responds to an assertion of a write mux 0 signal WM<0> to select for the zeroth column during the write operation.

A write driver logic circuit 135 that is partially shown in FIG. 1 controls the operation of the write driver. The bit in the write mask control signal to control whether the multiplexed group of columns 100 is write masked is denoted as a write mask wby signal. To process the write mask signal wby in the write driver logic circuit 135 with an input data signal (din), the input data signal din is inverted by an inverter 120 and processed by a logic gate such as a NOR gate 130 with the write mask signal wby to produce a write mask data in signal that is denoted as din_wby. Similarly, a logic gate such as a NOR gate 125 processes the data in signal with the write mask signal wby to produce a complement buffered version of the write mask data in signal that is denoted as dinb_wby.

Figure 2:
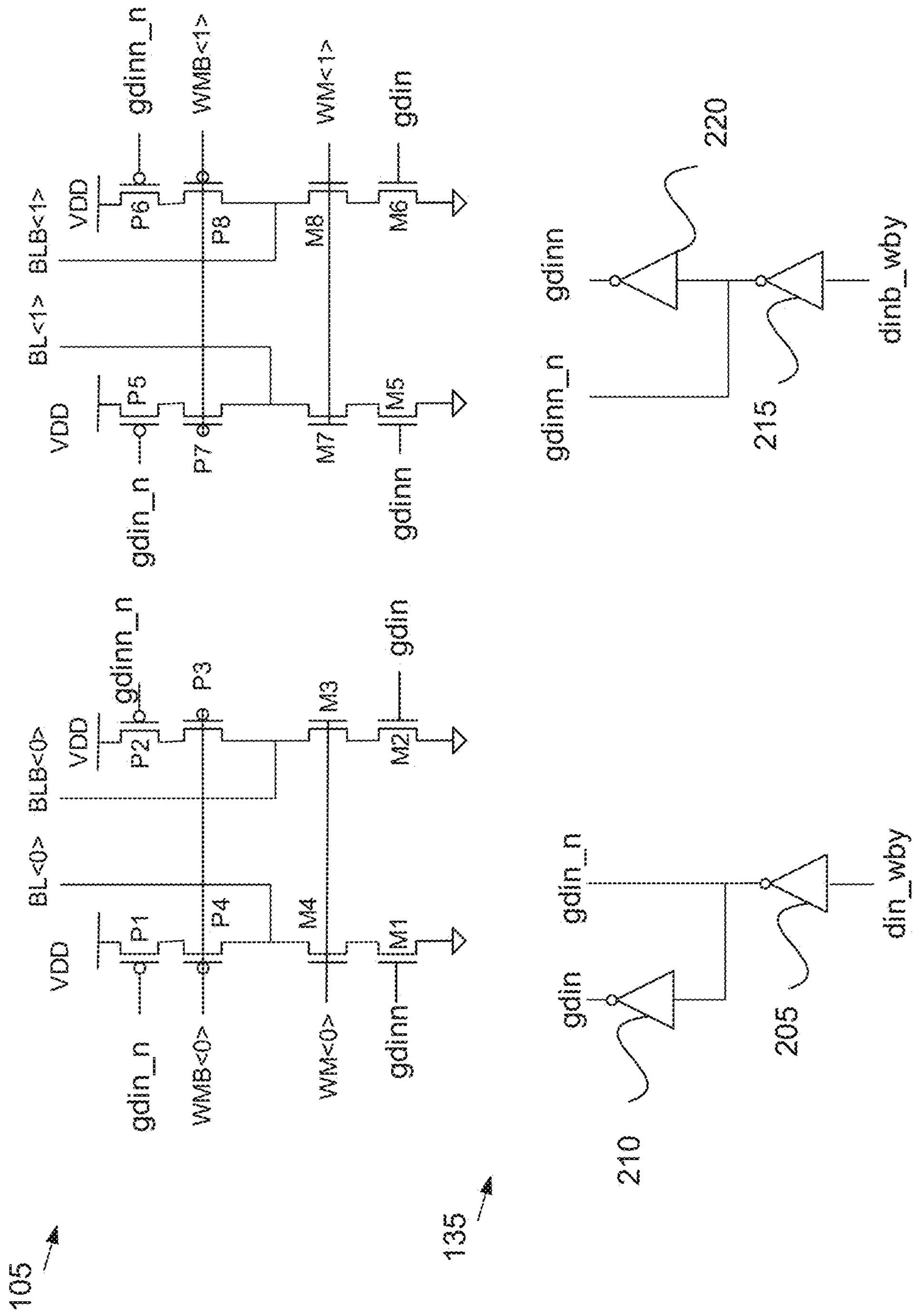
FIG. 2 is a circuit diagram of the write column multiplexer and a portion of the write driver logic circuit of FIG. 1.

The write multiplexer 105 and a remaining portion of the write driver logic circuit 135 is shown in FIG. 2. The zeroth bit line BL<0> is written to by a pair of write driver transistors formed by a p-type metal-oxide semiconductor (PMOS) write driver transistor P1 and an n-type metal-oxide semiconductor (NMOS) write driver transistor M1. A source of the write driver transistor P1 couples to a power supply node for a memory power supply voltage VDD whereas a source of the write driver transistor M1 couples to ground. The drain of the write driver transistor P1 couples to the zeroth bit line BL<0> through a write multiplexer PMOS transistor P1 having a gate coupled to a complement of the write mux 0 signal denoted as WMB<0>. Similarly, the drain of the write driver transistor M1 couples to the zeroth bit line BL<0> through a write driver NMOS transistor M4 having a gate coupled to the write mux 0 signal WM<0>. Thus, when the write mux 0 signal WM<0> is asserted by being charged to the memory power supply voltage VDD, the write driver transistors P4 and M4 are switched on and are switched off if the write mux 0 signal WM<0> is de-asserted by being grounded.

Suppose that the write mux 0 signal WM<0> is asserted to address a write operation to the zeroth column. As defined herein, a binary signal such as the write mux 0 signal WM<0> is deemed to be asserted herein when the binary signal is true, regardless of whether the true state is represented by an active-high or an active-low convention. In an active-low convention, a binary signal is thus asserted by being discharged to ground. Conversely, a binary signal is asserted by being charged to a power supply voltage in an active-high convention. When the write mask signal wby is asserted by being charged to the memory power supply voltage VDD, it will be shown that both the write driver transistors M1 and P1 are turned off so that the zeroth bit line BL<0> floats regardless of whether the write mux 0 signal WM<0> is asserted or not. Referring again to the NOR gates 130 and 125, it may be seen that the write mask data in signals din_wby and dinb_wby will both be binary zeroes if the write mask signal wby is asserted. Since both write driver transistors M1 and P1 will then be off, it may be appreciated that these transistors should not be controlled by the din_wby and dinb_wby signals respectively as the binary zero value for the din_wby signal would switch on the write driver transistor P1 in response to the assertion of the write mask signal wby. But each pair of write driver transistors such as the write driver transistor pair M1/P1 should be controlled in a complementary fashion (one transistor in the pair being off and one being on depending upon the value of the data input bit) when the corresponding column is selected for a write operation in which the write mask bit is de-asserted.

To keep each pair of write driver transistors off when the write mask signal wby is asserted and controlled in a complementary fashion when the write mask bit is de-asserted may use four control signals denoted herein as gdin, gdin_n, gdinn, and gdin_n. As implied by its name, the gdin signal has the same binary value as the data in signal din when the write mask bit is de-asserted. The gdin_n signal is the complement of the gdin signal as generated an inverter 205 that inverts the din_wby signal. An inverter 210 inverts the gdin_n signal to provide the gdin signal. The gdinn signal is the complement of the data in signal din when the write mask signal wby is de-asserted. The gdinn_n signal is the complement of the gdinn signal as generated by an inverter 215 that inverts the dinb_wby signal. An inverter 220 inverts the gdinn_n signal to provide the gdinn signal. The gdinn signal drives the gate of the write driver transistor M1 whereas the gdin_n signal drives the gate of the write driver transistor P1. During a write operation to the zeroth column with the write driver signal wby being de-asserted, the pair of write driver transistors M1 and P1 are thus controlled in a complementary fashion (one being on and one being off) depending upon the value of the data input bit. For example, if the data in signal din is a binary one, then the gdin_n signal and the gdinn signal are both binary zeroes such that the write driver transistor P1 is on and the write driver transistor M1 is off to maintain the precharge of the zeroth bit line BL<0> at the memory power supply voltage VDD. Conversely, if the data in signal din is a binary zero, then the gdin_n and the gdinn signals are both binary ones such that the write driver transistor P1 is off and the write driver transistor M1 is on to discharge the zeroth bit line BL<0> to ground. But if the write driver bit wby is asserted, the gdin_n signal is a binary one whereas the gdinn signal is a binary zero such that both the write driver transistors M1 and P1 are off to cause the zeroth bit line BL<0> to float during the write operation.

The remaining bit lines are controlled by a pair of write driver transistors and a pair of write multiplexer transistors that are arranged analogously as discussed for transistors P1, P4, M4, and M1. For example, a write driver PMOS transistor P2 has a source coupled to the power supply node for the memory power supply voltage VDD and has a drain coupled to the complement zeroth bit line BLB<0> through a PMOS write multiplexer transistor P3 controlled by the complement write mux 0 signal WMB<0>. Similarly, a write driver NMOS transistor M2 has a source coupled to ground and a drain that couples to the complement zeroth bit line BLB<0> through a write multiplexer NMOS transistor M3 controlled by the write mux 0 signal WM<0>. The write multiplexer transistors M3 and P3 are thus both on if the write mux 0 signal WM<0> is asserted and are both off if the write mux 0 signal WM<0> is de-asserted.

Similarly, a write driver PMOS transistor P5 has a source coupled to the power supply node and has a drain coupled to the first bit line BL<1> through a write multiplexer PMOS transistor P7 controlled by a complement of the write mux 1 signal WMB<1>. A write driver NMOS transistor M5 has a source coupled to ground and a drain that couples to the first bit line BL<1> through a write multiplexer NMOS transistor M7 controlled by the write mux 1 signal WM<1>. Similarly, a write driver PMOS transistor P6 has a source coupled to the power supply node and has a drain coupled to the complement first bit line BLB<1> through a write multiplexer PMOS transistor P8 controlled by the complement of the write mux 1 signal WMB<1>. Finally, a write driver NMOS transistor M6 has a source coupled to ground and has a drain that couples to the complement first bit line BLB<1> through a write multiplexer NMOS transistor M8 controlled by the write mux 1 signal WM<1>. The write multiplexer transistors P7, P8, M7, and M8 are thus all switched on when the write mux 1 signal WM<1> is asserted and are all switched off when the write mux 1 signal is de-asserted.

The write driver transistor pairs P2/M2, P5/M5, and P6/M6 are controlled analogously as discussed for the write driver transistor pair P1 and M1. For example, the pair of write driver transistors P2 and M2 are controlled by the gdinn_n and gdin control signals, respectively. If the data in signal din is a binary one while the write mask signal wby is de-asserted during a write operation to the zeroth column, then the gdin and the gdinn_n signals are both binary ones such that the write driver transistor P2 is off and the write driver transistor M2 is on to discharge the complement zeroth bit line BLB<0> to ground. Conversely, if the data in signal din is a binary zero, then the gdin and the gdinn_n signals are both binary zeroes such that the write driver transistor P2 is on and the write driver transistor M2 is off to maintain the precharge of the complement zeroth bit line BLB<0> to the memory power supply voltage VDD. But if the write driver signal wby is asserted, the gdin signal is a binary zero whereas the gdinn signal is a binary one such that both the write driver transistors M2 and P2 are off to cause the complement zeroth bit line BL<0> to float during a write operation to the zeroth column.

The pair of write driver transistors P5 and M5 are controlled by the gdin_n and gdinn signals, respectively. If the data in signal din is a binary one while the write mask signal wby is de-asserted during a write operation to the zeroth column, then the gdin_n and the gdinn signals are both binary zeroes such that the write driver transistor P5 is on and the write driver transistor M5 is off to maintain the precharge of the first bit line BL<1> to the memory power supply voltage. Conversely, if the data in signal din is a binary zero, then the gdin_n and the gdinn signals are both binary ones such that the write driver transistor P5 is off and the write driver transistor M5 is on to discharge the first bit line BL<1> ground. But if the write driver signal wby is asserted during a write operation to the first column, then the gdinn signal is a binary zero whereas the gdin_n signal is a binary one such that both the write driver transistors M5 and P5 are off to cause the first bit line BL<1> to float.

Finally, the pair of write driver transistors P6 and M6 are controlled by the gdinn_n and gdin signals, respectively. If the data in signal din is a binary one while the write mask signal wby is de-asserted during a write operation to the first column, then the gdin and the gdinn_n signals are both binary ones such that the write driver transistor M6 is on and the write driver transistor P6 is off to discharge the complement first bit line BLB<1> to ground. Conversely, if the data in signal din is a binary zero, then the gdin and the gdinn_n signals are both binary zeroes such that the write driver transistor P6 is on and the write driver transistor M6 is off to charge the complement first bit line BLB<1> to the memory power supply voltage VDD. But if the write driver signal wby is asserted during a write operation to the first column, then the gdin signal is a binary zero whereas the gdinn_n signal is a binary one such that both the write driver transistors M6 and P6 are off to cause the complement first bit line BLB<1> to float.

Referring again to the group of multiplexed columns 100 of FIG. 1, there is a separate precharge signal for each column since the precharge following a read operation occurs only to the write unselected column (or write unselected columns in a MUX4 or greater implementation). This precharge is also denoted herein as a cleanup operation. A zeroth bit line precharge signal BL PRE<0> controls whether a precharge circuit 110 precharges the bit lines for the zeroth column. Similarly, a first bit line precharge signal BL PRE<1> controls whether a precharge circuit 115 precharges the bit lines for the first column. Both precharge signals may be active-low signals or active-high signals.

The bitcells in the multiplexed group of columns 100 are arranged into N rows, where N is a plural positive integer. For illustration clarity, only a zeroth row and an (N−1)th row are shown in FIG. 1. A corresponding word line (WL) traverses each row. For example, a zeroth word line WL<0> traverses the zeroth row of bitcells whereas an (N−1)th word line WL<N−1> traverses the (N−1)th row of bitcells. During a read operation, a read multiplexer (not shown for illustration clarity) selects a column from the multiplexed group of columns.

Figure 3:
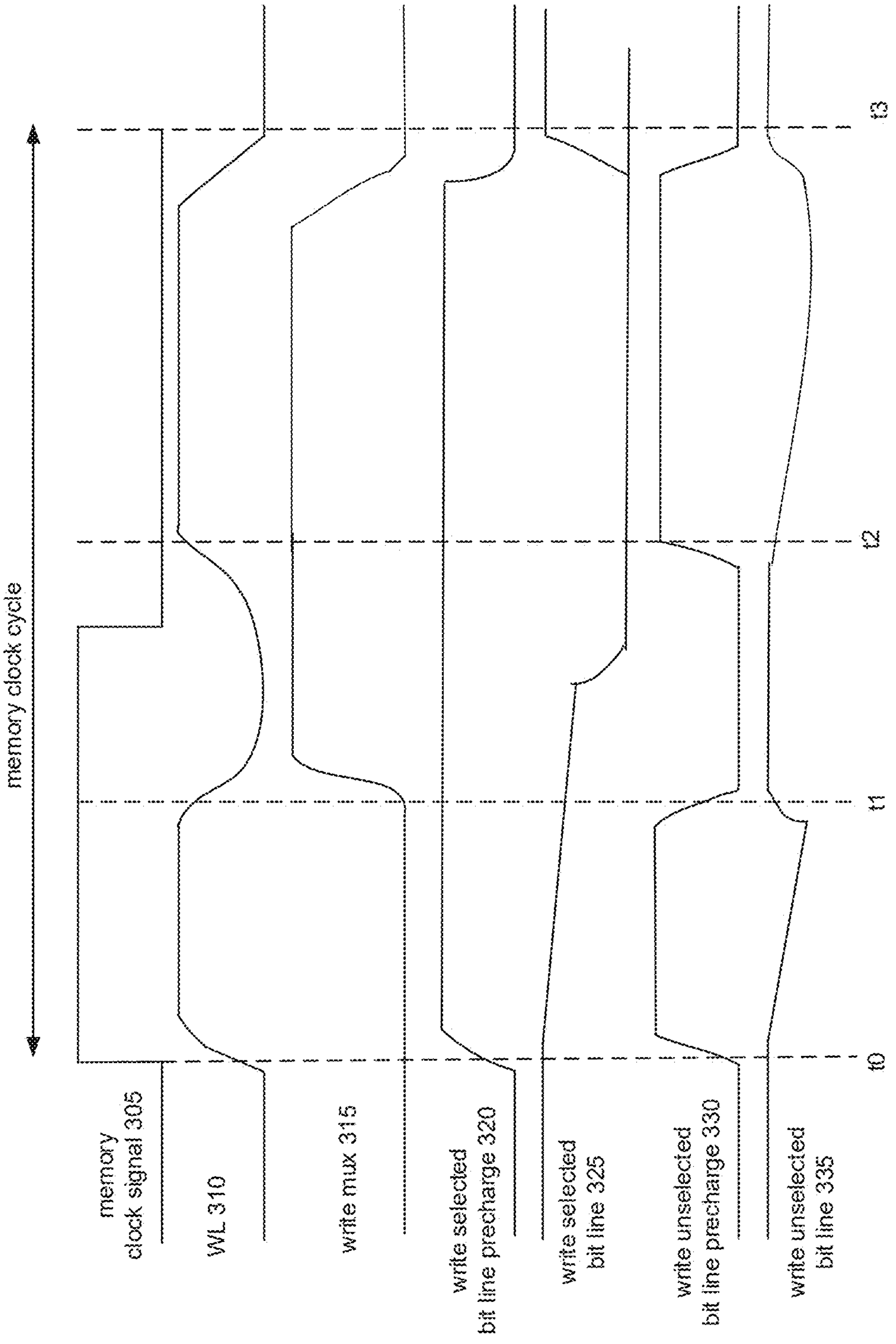
FIG. 3 is a timing diagram of some operating waveforms for the time-shared serial read write memory of FIG. 1.

The time-shared cleanup to the unselected column while a write operation occurs to the selected column in the multiplexed group of columns 100 when the write mask bit is not asserted may be better appreciated with respect to the timing diagram of FIG. 3. In this implementation the precharge signals are active-low signals. Prior to a read operation beginning at time to, the bit lines for the columns in the multiplexed group of columns 100 are precharged to the memory power supply voltage VDD. Depending upon which column is the write selected column, one of the precharge signals may also be denoted as a write selected bit line precharge signal 320 whereas the precharge signal for the write unselected column may be denoted as a write unselected bit line precharge signal 330 as shown in FIG. 3. As also shown in FIG. 3, the read operation begins at a time to in response to an assertion of a memory clock signal 305. Prior to the read operation beginning at time t0, both the write selected bit line precharge signal 320 and the write unselected bit line precharge signal 330 are asserted by being discharged so that the bit lines in the multiplexed group of columns 100 are charged to the memory power supply voltage. At time t0, the write selected bit line precharge signal 320 and the write unselected bit line precharge signal 330 are both released (de-asserted) by being charged to the memory power supply voltage. In this fashion, the precharge does not interfere with the read operation. In turn, the assertion of the memory clock signal triggers an assertion of a word line voltage (WL 310) for the addressed one of the word lines during the read.

The read operation may be to either the write selected column or the write unselected column. While the word line voltage 310 is asserted during the read operation from time to t0 a time t1, a voltage difference develops across the bit line pairs in each column that intersects with the word line, regardless of whether the column is selected or not. For illustration clarity, just one bit line voltage (a write selected bit line voltage 325) is shown for the write selected column. Similarly, just one bit line voltage (a write unselected bit line voltage 335) is shown for the write unselected column. In this example, the binary value stored in the accessed bitcell for the write selected column and stored in the accessed bitcell for the write unselected column is such that both the write selected bit line voltage 325 and the write unselected bit line voltage 335 decline during the read operation. Should the accessed bitcell be storing a complement of this binary value, then the write selected bit line voltage 325 and the write unselected bit line voltage 335 would both substantially remain charged to the memory power supply during the read operation. Note that at the conclusion of the read operation at time t1, there is no cleanup operation for the write selected column. Instead, the write operation begins at time t1 with the assertion of a write mux signal 315. Depending upon which column is the write selected column, the write mux signal 315 may be one of the write mux 1 or 0 signals discussed earlier. Depending upon the binary value of the data in signal din, the write selected bit line 325 will either be discharged to ground or charged back to the memory power supply voltage VDD after time t1. This write driving of the bit lines for the selected column beginning at time t1 occurs in parallel with a cleanup operation to the write unselected column that also begins at time t1 with the assertion of the write unselected bit line precharge signal 330 (recall that the bit line precharge signals in one implementation are active-low such that they are asserted by being discharged). During the cleanup operation, the word line voltage 310 is released. The write unselected bit line voltage 335 is thus precharged back to the memory power supply voltage during the cleanup operation.

Prior to or approximate with time t2, the word line voltage 310 is again asserted as part of the write operation to the selected column. Although FIG. 3 implies that the same word line is asserted in both the read and write operations, note that the write and read operations may involve the assertion of different word lines. Thus, the assertion of the word line voltage 310 after time t1 in FIG. 3 may be for a different word line in the bank as compared to the word line voltage occurring at time to. At time t2, the word line voltage 310 is fully asserted. At the same time, the write unselected bit line precharge signal 330 is released by being charged back to the memory power supply voltage to release the precharge for the write unselected column.

With regard to the write operation to the write selected column, note that it may be the case that the binary value being written is such that the write selected bit line voltage 325 is fully discharged after time t1 and before time t2. It may readily be appreciated that a considerable amount of power was saved by not first cleaning up the write selected bit line voltage 325 in that scenario since the read operation resulted in the write selected bit line voltage 325 being partially discharged. Alternatively, it may be the case that the binary value being written is such that the write selected bit line voltage 325 must be charged to the memory power supply voltage during the read operation. Since there is no assertion of the write selected bit line precharge voltage 320 between the serial read and write operations, the write driver itself performs this bit line charging.

Regardless of whether a binary 1 or a binary 0 is to be written during the write operation, note that 50% of the time (assuming that binary ones and zeroes having approximately the same probability of being stored in the corresponding memory) this binary value will equal the binary value being read during the preceding read operation. In that case, either the bit line or the complement bit line voltage will behave as shown for the write selected bit line voltage 325: the voltage decline that began during the read operation to a partially discharged state is then accelerated during the write operation beginning after time t1 so that the partially discharged state becomes a fully-discharged-to-ground state. It may readily be appreciated that it saves a considerable amount of power to not cleanup such a bit line voltage between the read and write operations. Even if the bit line voltage must be recharged through the write driver, note that the write operation speed is increased since the write operation may begin with the assertion of the write mux signal 315 at time t1.

At time t2, the word line voltage 310 is again asserted for the write operation. From time t2 to just prior to a time t3, the write mux signal 315 and the word line voltage 310 continue to be asserted to provide a sufficient write margin to the write operation. At time t3, the word line voltage 310, the write mux signal 315, and the write unselected bit line precharge signal 330 are all released. Time t3 is also the end of the clock cycle for the memory clock signal 305. The write selected bit line precharge signal 320 remains released from time to t0 just before time t3. As compared to the traditional memory, the time-shared serial read write memory operation results in a shorter memory clock cycle and thus a faster serial read write cycle because of the write operation to the write selected column beginning in parallel with the cleanup to the write unselected column at time t1.

With the concepts of a time-shared serial read write operation in mind, consider what may happen to the write selected column should the write mask bit wby be asserted. In that case, the bit lines in the write selected column such as the write selected bit line 325 will float during what would have been the write operation from time t1 to time t3. But the read operation may have partially discharged the write selected bit line 325. Should the accessed bitcell be storing a binary value such that the write selected bit line 325 should instead be charged to the memory power supply voltage VDD, the floating of the bit lines for the write selected column during what would have been the write operation with the write mask active may result in the accessed bitcell for the write selected column getting corrupted (written to) from the result of the preceding read operation such that its stored bit becomes the complement of what was intended.

Figure 4:
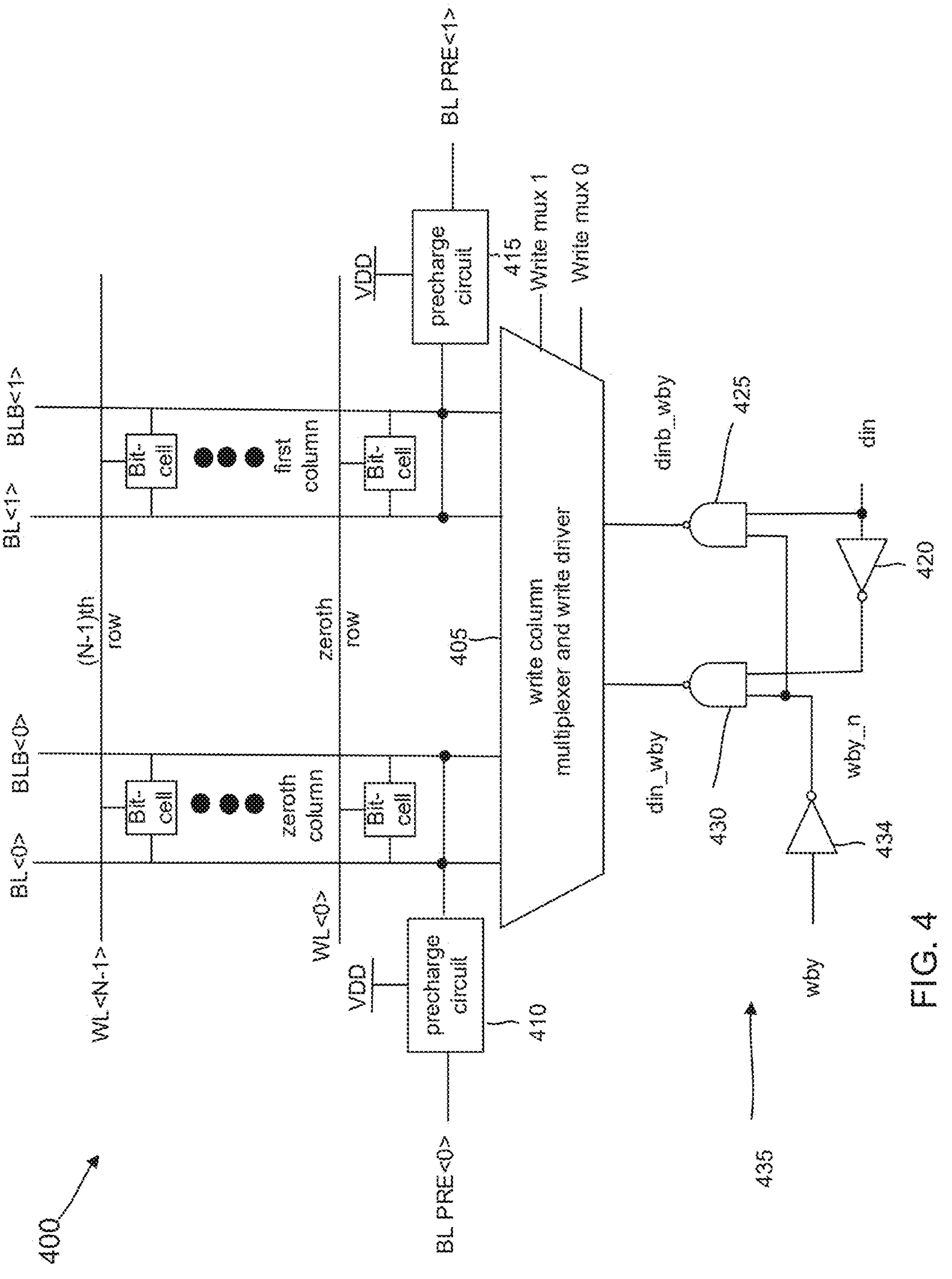
FIG. 4 illustrates a time-shared serial read write memory that is compatible with write mask in accordance with an aspect of the disclosure.

A write-mask-compatible time-shared serial read write memory is disclosed herein in which an active write mask does not affect the binary content of the accessed bitcell in the write selected column. This is quite advantageous as the time sharing already results in increased memory speed and reduced power consumption becomes even more efficient with the ability to practice write masking. An example group of multiplexed columns 400 for a write-mask-compatible time-shared serial read write memory is shown in FIG. 4. The write mask signal to control whether the multiplexed group of columns 400 is write masked is again denoted as a write mask signal wby. In this example, the memory is a "MUX2" memory in which the multiplexed group of columns 400 includes just two columns, namely, a zeroth column and a first column. Although the multiplexed group of columns 400 is included within a MUX2 memory, it will be appreciated that a greater number of columns (e.g., 4 or 8) may be used in alternative implementations. As discussed for the multiplexed group of columns 100, a bit line BL<0> and its complement BLB<0> traverses the zeroth column of bitcells in the multiplexed group of columns 400. Similarly, a bit line BL<1> and its complement BLB<1> traverses the first column of bitcells. A write column multiplexer and write driver 405 selects for a write selected one of the columns during a write operation. In the following discussion, the write column multiplexer and write driver 405 is referred to simply as a write column multiplexer 405 for brevity. A first portion of a write driver logic circuit 435 that controls the operation of the write driver through a plurality of control signals is also shown in FIG. 4. The write column multiplexer 405 responds to an assertion of the write mux 1 signal WM<1> to select for the first column in the write operation. Conversely, the write column multiplexer 105 responds to an assertion of the write mux 0 signal WM<0> to select for the zeroth column during the write operation.

During a write operation, it may be that the write mask signal wby is inactive (de-asserted) such that the write driver would then proceed to drive the bit lines in the selected column to the appropriate binary values depending upon the binary value of the data in signal din. But with the write mask signal wby being asserted, the write driver logic circuit 435 controls the write driver to charge the bit lines in the selected column to the memory power supply voltage VDD during a first portion of the write operation that is denoted herein as a write mask precharge period that extends substantially from when the write mask signal wby is asserted until the word line assertion for the write operation. At the assertion of the word line for the write operation, the write-driver-induced pre-charging of the bit lines of the selected column is released so that the bit lines of the selected column float. In this fashion, the precharged and floating bit lines of the selected column do not corrupt the accessed bitcell in the selected column.

To produce this advantageous pre-charging of the bit lines in the selected column during the write mask precharge period, the write driver logic circuit 435 is responsive to a write clock signal welk (not shown in FIG. 4) that is asserted after the write mask signal wby is asserted and has substantially the same timing as the word line during the write operation. In the following discussion, it will be assumed that the write clock signal welk is an active-high signal such that it is asserted by being charged to the memory power supply voltage although an active-low convention may be used in alternative implementations.

An inverter 434 in the write driver logic circuit 435 inverts the write mask signal wby to produce a complement write mask signal wby_n. To process the complement write mask signal wby_n in the write driver logic circuit 435 with the data in signal din, the data in signal din is inverted by an inverter 420 and processed by a logic gate such as a NAND gate 430 with the complement write mask signal wby_n to produce a write mask data in signal that is again denoted as din_wby. Similarly, a logic gate such as a NAND gate 425 processes the data in signal din with the complement write mask signal wby_n to produce a complement of the write mask data in signal that is again denoted as dinb_wby. The inverter 420 is also denoted herein as a first inverter.

Should the write mask signal wby be a binary zero (the write mask not being active), the complement write mask signal wby_n will be a binary one such that the NAND gates 425 and 430 function as an inverter with respect to their data input signals. The write mask data in signal din_wby will thus have the same binary value as the data in signal din when the write mask is not active. Conversely, the complement write mask data in signal dinb_wby will be the complement of the data in signal din when the write mask is not active.

The bitcells for the group of multiplexed columns 400 are arranged as discussed for the multiplexed group of columns 100. Thus, the bitcells in the multiplexed group of columns 400 are arranged into N rows, where N is a plural positive integer. For illustration clarity, only a zeroth row and an (N−1)th row are shown in FIG. 4. A corresponding word line (WL) traverses each row. For example, the zeroth word line WL<0> traverses the zeroth row of bitcells whereas the (N−1)th word line WL<N−1> traverses the (N−1)th row of bitcells. During a read operation, a read multiplexer (not shown for illustration clarity) selects a column from the multiplexed group of columns.

As also discussed analogously with respect to the multiplexed group of columns 100, there is a separate precharge signal for each column in the multiplexed group of columns 400 since the cleanup operation occurs only to the write unselected column (or write unselected columns in a MUX4 or greater implementation). For example, the zeroth bit line precharge signal BL PRE<0> controls whether a precharge circuit 410 precharges the bit lines for the zeroth column. Similarly, the first bit line precharge signal BL PRE<1> controls whether a precharge circuit 415 precharges the bit lines for the first column. Both of these precharge signals may be active-low signals or active-high signals.

Figure 5:
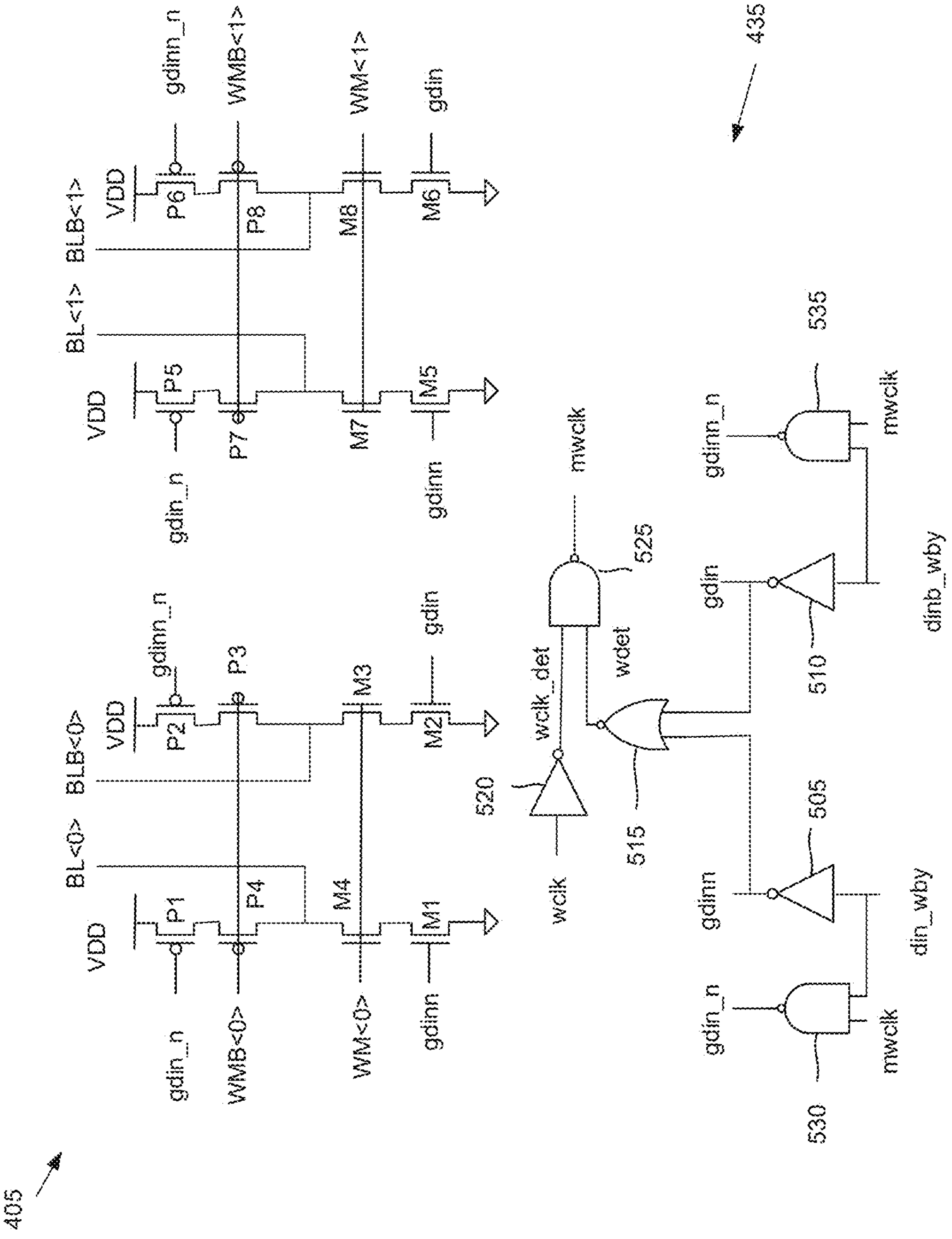
FIG. 5 is a circuit diagram of the write column multiplexer and a portion of the write driver logic circuit of FIG. 4 in accordance with an aspect of the disclosure.

The write multiplexer 405 and the remaining portion of the write driver logic circuit 435 is shown in FIG. 5. The write driver transistors P1, P2, P5, P6, M1, M2, M5, M6 as well as the write multiplexer transistors P3, P4, P7, P8, M3, M4, M7, and M8 are arranged as discussed with respect to the multiplexed group of columns 100. Depending upon the context, the write driver transistors P1 and P5 or the write driver transistors M1 and M5 are each an example of a first write driver transistor as defined herein. Similarly, depending upon the context, the write driver transistors P1 and P5 or the write driver transistors M1 and M5 are each an example of a second write driver transistor as defined herein. The zeroth bit line BL<0> is written to by the write driver transistors P1 and M1. The drain of the write driver transistor P1 couples to the zeroth bit line BL<0> through the write multiplexer transistor P4 having its gate driven by the complement write mux 0 signal WMB<0>. Similarly, the drain of the write driver transistor M1 couples to the zeroth bit line BL<0> through the write multiplexer transistor M4 having its gate driven by the write mux 0 signal WM<0>. Thus, when the write mux 0 signal WM<0> is asserted by being charged to the memory power supply voltage VDD, the write multiplexer transistors P4 and M4 are switched on and are switched off if the write mux 0 signal WM<0> is de-asserted by being grounded. Similarly, the write multiplexer transistors P3 and M3 are switched on if the write mux 0 signal WM<0> is asserted and are off if the write mux 0 signal WM<0> is not asserted. In the same fashion, the write multiplexer transistors P7, P8, M7, and M8 are switched on if the write mux 1 signal WM<1> is asserted and are switched off if the write mux 1 signal is not asserted.

An inverter 505 inverts the write mask data in signal din_wby to produce the control signal gdinn. The inverter 505 is also denoted herein as a second inverter and has an output terminal coupled to a gate of each of the write driver transistors M1 and M5. Should the write mask signal why not be asserted, the gdinn signal will be the complement of the data in signal din due to the inversion by the inverter 505. Similarly, an inverter 510 inverts the complement write mask data in signal dinb_wby to produce the control signal gdin. Should the write mask signal why not be asserted, the gdin signal will thus have the same binary value as the data in signal din. The inverter 510 is also denoted herein as a third inverter and has an output terminal coupled to a gate of each of the write driver transistors M2 and M6. Since the write mask data in signals din_wby and dinb_wby are complements of each other when the write mask signal wby is not asserted, the gdin and gdinn signals will thus be the complements of each other when the write mask signal is not asserted. But if the write mask signal wby is asserted, the write mask data in signal din_wby and the complement write mask data in signal dinb_wby will both be binary ones. The gdin and gdinn signals will thus both be binary zeroes if the write mask signal wby is asserted.

The gdinn signal drives the gates of the write driver transistors M1 and M5 whereas the gdin signal drives the gates of the write driver transistor M2 and M6. The NMOS write driver transistors M1, M2, M5, and M6 will thus all be off should the write mask be active during a write operation. With respect to ground, the corresponding bit lines of a selected column will thus float during the write operation if the write mask signal wby is asserted. The gdin and gdinn signals are thus a convenient pair of signals to detect whether the write mask is active during the write mask precharge period. For example, a logic gate such as a NOR gate 515 may process the gdin and gdinn signals to produce a write mask detect signal wdet.

An inverter 520 inverts the active-high write clock welk to produce a write clock detect signal wclk_det that is processed in a NAND gate 525 with the write mask detect signal wdet to produce a write mask clock signal mwclk. At the assertion of the write mask signal wby for the selected column, the write clock detect signal wclk_det will thus be a binary one since the write clock signal is asserted after the assertion of the write mask signal wby. Should the write mask be active, the write mask detect signal wdet will also be a binary one such that the write mask clock signal mwclk will be a binary zero. To control the PMOS write driver transistors P1 and P5, a NAND gate 530 processes the write mask data in signal din_wby with the write mask clock signal mwclk to produce the control signal gdin_n. The gdin_n signal will thus be a binary zero to switch on the write driver transistors P1 and P5 to charge the zeroth and first bit lines BL<0> and BL<1> to the memory power supply voltage VDD following the assertion of the write mask signal wby. When the write clock signal wclk is asserted, the write mask clock signal mwclk will also be asserted to force the gdin_n signal to be a binary one. Since the write clock signal wclk is asserted substantially simultaneously with the word line assertion for the write operation, the write driver transistors P1 and P5 will float their respective bit lines during the word line assertion period.

The control of the PMOS write driver transistors P2 and P6 is performed analogously. In that regard, a NAND gate 535 processes the complement write mask data in signal dinb_wby with the write mask clock signal mwclk to produce the control signal gdinn_n that drives the gates of the write driver transistors P2 and P6. The gdinn_n signal will thus be a binary zero to switch on the write driver transistors P2 and P6 to charge the zeroth and first complement bit lines BLB<0> and BLB<1> to the memory power supply voltage VDD following the assertion of the write mask signal wby. When the write clock signal welk is asserted, the write mask clock signal mwclk will also be asserted to force the gdinn_n signal to be a binary one. Since the write clock signal welk is asserted substantially simultaneously with the word line assertion for the write operation, the write driver transistors P2 and P6 will float their respective bit lines during the word line assertion period.

As already noted, the NMOS write driver transistors M3, M4, M7, and M8 are off in response to the assertion of the write mask signal wby. The NMOS write driver transistor M3, M4, M7, and M8 thus do not interfere with the charging of their respective bit lines during the write mask precharge period. Should the write mask signal wby be de-asserted, the pair of write driver transistors for each bit line in the selected column are operated in a complementary fashion (one being off and one being on) so that the bit line is either charged or discharged depending upon the binary value of the data in signal din.

Figure 6:
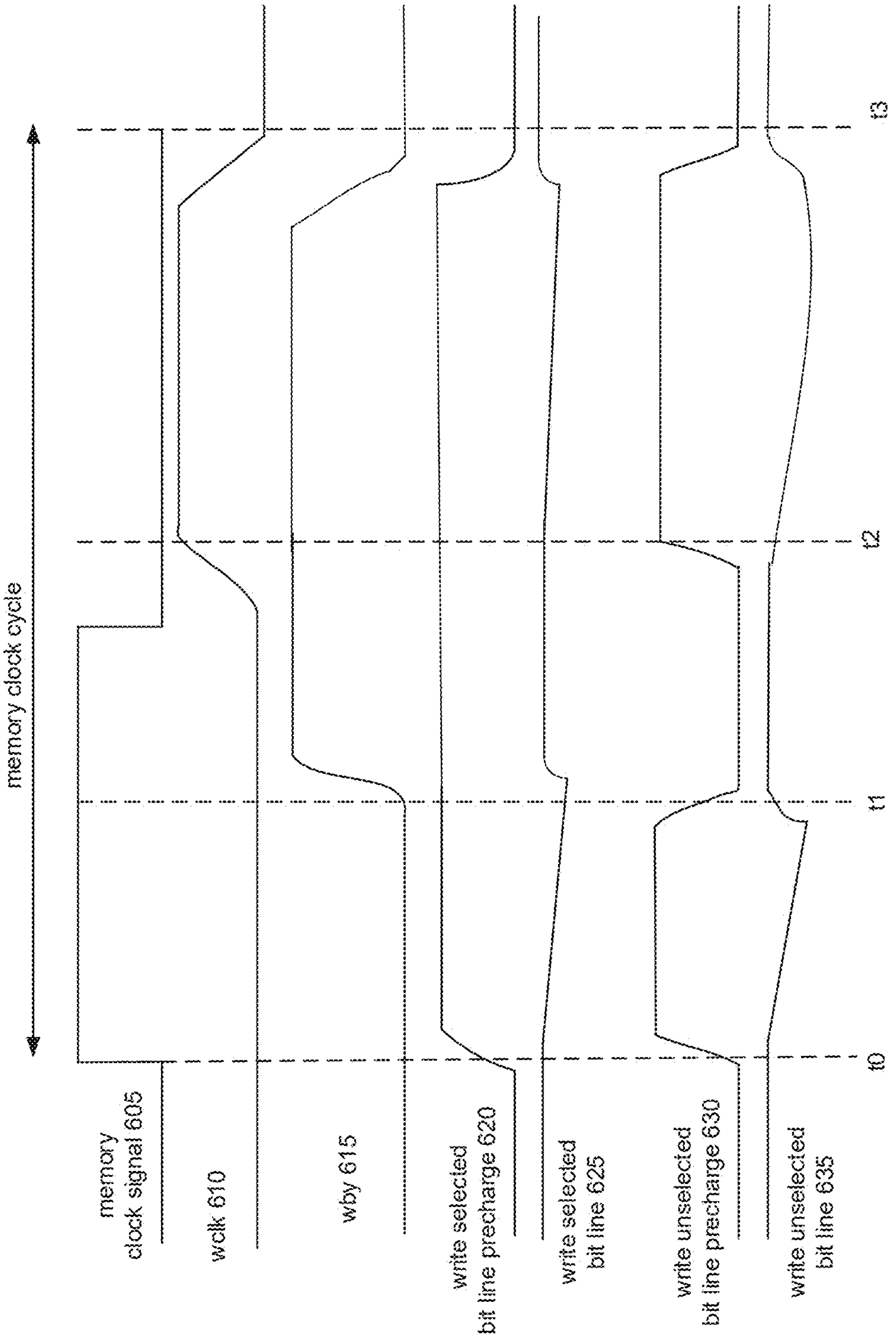
FIG. 6 is a timing diagram of some operating waveforms for the time-shared serial read write memory of FIG. 4.

An appreciation of the operation of the multiplexed group of columns 400 when the write mask is active may be improved with a consideration of the waveforms in the timing diagram of FIG. 6. In this implementation the precharge signals are active-low signals. Prior to a read operation beginning at time t0, the bit lines for the columns in the multiplexed group of columns 400 are precharged to the memory power supply voltage VDD. Depending upon which column is the write selected column, one of the precharge signals may also be denoted as a write selected bit line precharge signal 620 whereas the precharge signal for the write unselected column may be denoted as a write unselected bit line precharge signal 630. As also shown in FIG. 6, the read operation begins at a time to in response to an assertion of a memory clock signal 605. Prior to the read operation beginning at time to, both the write selected bit line precharge signal 620 and the write unselected bit line precharge signal 630 are asserted by being discharged so that the bit lines in the multiplexed group of columns 400 are charged to the memory power supply voltage. At time to, the write selected bit line precharge signal 620 and the write unselected bit line precharge signal 630 are both released (de-asserted) by being charged to the memory power supply voltage. In this fashion, the precharge does not interfere with the read operation.

The read operation may be to either the write selected column or the write unselected column. While a word line is asserted during the read operation from time t0 to a time t1, a voltage difference develops across the bit line pairs in each column that intersects with the word line, regardless of whether the column is selected or not. For illustration clarity, just one bit line voltage (a write selected bit line voltage 625) is shown for the write selected column. Similarly, just one bit line voltage (a write unselected bit line voltage 635) is shown for the write unselected column. In this example, the binary value stored in the accessed bitcell for the write selected column and stored in the accessed bitcell for the write unselected column is such that both the write selected bit line voltage 625 and the write unselected bit line voltage 635 decline during the read operation. Should the accessed bitcell be storing a complement of this binary value, then the write selected bit line voltage 625 and the write unselected bit line voltage 635 would both substantially remain charged to the memory power supply during the read operation. Note that at the conclusion of the read operation at time t1, there is no cleanup operation for the write selected column. Instead, the write operation begins at time t1 but is write masked with the assertion of the write mask signal wby 615. A write clock welk 610 is not asserted until a time t2 that is substantially simultaneous with the assertion of the word line (not illustrated in FIG. 6) for the write operation. The write mask precharge period thus extends from time t1 to time t2. The write selected bit line 625 is thus charged back to the memory power supply voltage VDD after time t1 and begins to float at time t2. The accessed bitcell in the selected column may then begin discharging the write-selected bit line voltage 625 from time t2 to a time t3 when the word line is again released. But this dummy read operation does not corrupt the accessed bitcell's stored binary content due to the charging and floating of the bit lines.

Figure 7:
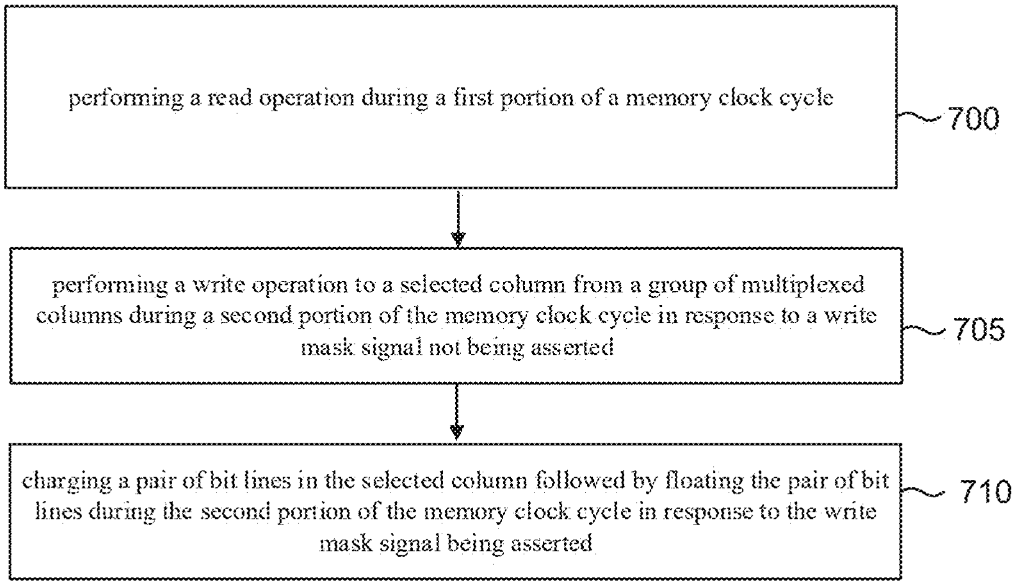
FIG. 7 is a flowchart for a method of operation for a time-shared serial read write memory with write mask in accordance with an aspect of the disclosure.

An example method of operation for a serial read write memory that is compatible with write mask will now be discussed with reference to the flowchart of FIG. 7. The method includes an act 700 of performing a read operation during a first portion of a memory clock cycle. The read operation occurring from time to t0 time t1 of FIG. 6 is an example of act 700. The method also includes an act 705 of performing a write operation to a selected column from a group of multiplexed columns during a second portion of the memory clock cycle in response to a write mask signal not being asserted. The writing to a selected column by the write multiplexer 405 of FIG. 4 while the write mask signal wby is not asserted is an example of act 705. Finally, the method includes an act 710 of charging a pair of bit lines in the selected column followed by floating the pair of bit lines during the second portion of the memory clock cycle in response to the write mask signal being asserted. The charging of the write selected bit line 625 of FIG. 6 from time t1 to time t2 and the floating of the write selected bit line 625 from time t2 to time t3 is an example of act 710.

Figure 8:
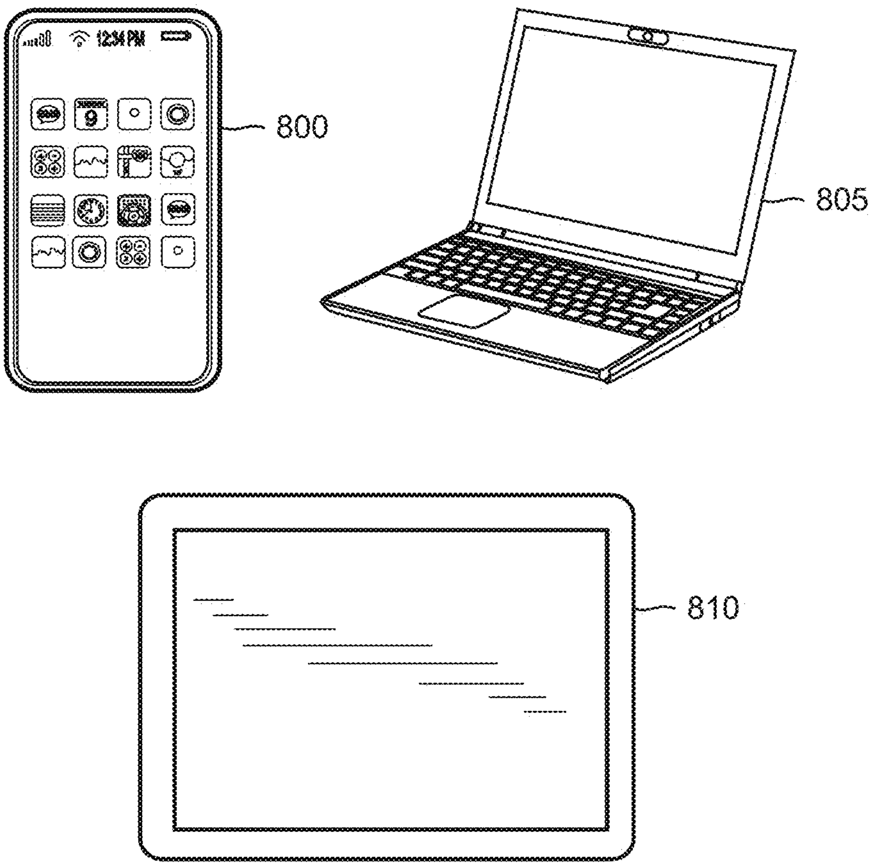
FIG. 8 illustrates some example electronic systems including a time-shared serial read write memory in accordance with an aspect of the disclosure.

A high-speed time-shared serial read write memory as disclosed herein may be incorporated in a wide variety of electronic systems. For example, as shown in FIG. 8, a cellular telephone 800, a laptop computer 805, and a tablet PC 810 may all include a high-speed time-shared serial read write memory in accordance with the disclosure. Other exemplary electronic systems such as a music player, a video player, a communication device, and a personal computer may also be configured with a high-speed time-shared serial read write memory constructed in accordance with the disclosure.

Some example implementations are described by the following numbered clauses:

Clause 1. A serial read write memory comprising:
- a power supply node for a memory power supply voltage;
- a first bit line for a first column of bitcells;
- a first write driver transistor coupled between the first bit line and the power supply node;
- a second write driver transistor coupled between the first bit line and ground; and
- a write driver logic circuit configured to drive the first write driver transistor and the second write driver transistor responsive to a data in signal during a write operation in which a write mask signal is not asserted, the write driver logic circuit being further configured to switch on the first write driver transistor and to switch off the second write driver transistor during a first portion of a write operation in which the write mask signal is asserted.

Clause 2. The serial read write memory of clause 1, wherein the write driver logic circuit is further configured to switch off the first write driver transistor and to maintain the second write driver transistor off during a remaining second portion of the write operation in which the write mask signal is asserted.

Clause 3. The serial read write memory of clause 2, wherein the write driver logic circuit comprises:
- a first inverter configured to invert the data in signal to produce a complement data in signal;
- a first logic gate configured to process the write mask signal with the complement data in signal to produce a first write mask data in signal; and
- a second logic gate configured to process the write mask signal with the data in signal to produce a second write mask data in signal that is a complement of the first write mask data in signal during the write operation in which the write mask signal is not asserted and equals the first write mask data in signal during the write operation in which the write mask signal is asserted.

Clause 4. The serial read write memory of clause 3, wherein the write driver logic circuit further comprises:

a second inverter configured to invert the first write mask data in signal, the second inverter having an output terminal coupled to a gate of the first write driver transistor.

Clause 5. The serial read write memory of clause 4, further comprising:

a first complement bit line for the first column of bitcells; and a third write driver transistor coupled between the first complement bit line and ground, wherein the write driver logic circuit further comprises a third inverter configured to invert the second write mask data in signal, the third inverter having an output terminal coupled to a gate of the third write driver transistor.

Clause 6. The serial read write memory of any of clauses 1-5, further comprising:

a first write multiplexer transistor coupled between the first write driver transistor and the first bit line; and a second write multiplexer transistor coupled between the second write driver transistor and the first bit line.

Clause 7. The serial read write memory of clause 6, wherein the first write multiplexer transistor and the first write driver transistor each comprises a p-type metal-oxide semiconductor (PMOS) transistor.

Clause 8. The serial read write memory of clause 6, wherein the second write multiplexer transistor and the second write driver transistor each comprises an n-type metal-oxide semiconductor (NMOS) transistor.

Clause 9. The serial read write memory of any of clauses 3-5, wherein the first logic gate and the second logic gate each comprises a NAND gate.

Clause 10. The serial read write memory of any of clauses 3-5, wherein the write driver logic circuit is further configured to process the first write mask data in signal and the second write mask data in signal to determine whether the write mask signal was asserted.

Clause 11. The serial read write memory of any of clause 2-5, wherein the write driver logic circuit is further configured to switch off the first write driver transistor and to maintain the second write driver transistor off during the remaining second portion of the write operation in response to an assertion of a write clock signal.

Clause 12. A method of operation for a serial read write memory, comprising:

performing a read operation during a first portion of a memory clock cycle;

performing a write operation to a selected column from a group of multiplexed columns during a second portion of the memory clock cycle in response to a write mask signal not being asserted; and charging a pair of bit lines in the selected column followed by floating the pair of bit lines during the second portion of the memory clock cycle in response to the write mask signal being asserted.

Clause 13. The method of clause 12, further comprising:

inverting the write mask signal to form an inverted write mask signal;

processing the inverted write mask signal with a data in signal to form a first write mask data in signal; and processing the inverted write mask signal with a complement of the data in signal to form a second write mask data in signal, wherein performing the write operation to the selected column is responsive to the first write mask data in signal and to the second write mask data in signal.

Clause 14. The method of clause 13, further comprising:

inverting the write mask signal to form a first write driver control signal; and controlling whether a first write driver transistor coupled between a bit line in the pair of bit lines and ground is on or off responsive to the first write driver control signal.

Clause 15. The method of any of clauses 12-14, wherein floating the pair of bit lines is responsive to an assertion of write clock signal.

Clause 16. A serial read write memory, comprising:

a column of bitcells including a bit line;

a first write driver transistor configured to charge the bit line to a power supply voltage in response to an assertion of a first control signal;

a second write driver transistor configured to ground the bit line in response to an assertion of a second control signal; and a write driver logic circuit configured to invert a data in signal to form the first control signal and the second control signal during a write operation in which a write mask is not active and to assert the first control signal and to de-assert the second control signal during a first portion of a write operation in which the write mask is active.

Clause 17. The serial read write memory of clause 16, further comprising:

a complement bit line for the column of bitcells;

a third write driver transistor configured to charge the complement bit line to a power supply voltage in response to an assertion of a third control signal; and a fourth write driver transistor configured to ground the complement bit line in response to an assertion of a fourth control signal, wherein the write driver logic circuit is further configured to form the third control signal and the fourth control signal to equal the data in signal during the write operation in which the write mask is not active.

Clause 18. The serial read write memory of clause 17, wherein the write driver logic circuit is further configured to assert the third control signal and to de-assert the fourth control signal during the first portion of the write operation in which the write mask is active.

Clause 19. The serial read write memory of any of clauses 16-18, wherein the write driver logic circuit is further configured to de-assert the first control signal and the second control signal during a second portion of the write operation in which the write mask is active.

Clause 20. The serial read write memory of clause 16, wherein the first write driver transistor is a PMOS transistor and wherein the second write driver transistor is an NMOS transistor.

As those of some skill in this art will by now appreciate and depending on the particular application at hand, many modifications, substitutions and variations can be made in and to the materials, apparatus, configurations and methods of use of the devices of the present disclosure without departing from the scope thereof as defined by the appended claims. In light of this, the scope of the present disclosure should not be limited to that of the particular implementations illustrated and described herein, as they are merely by way of some examples thereof, but rather, should be fully commensurate with that of the claims appended hereafter and their functional equivalents.

What is claimed is:

1. A serial read write memory comprising:
a power supply node for a memory power supply voltage;
a first bit line for a first column of bitcells;
a first write driver transistor coupled between the first bit line and the power supply node;
a second write driver transistor coupled between the first bit line and ground; and
a write driver logic circuit configured to drive the first write driver transistor and the second write driver transistor responsive to a data in signal during a write operation in which a write mask signal is not asserted, the write driver logic circuit being further configured to switch on the first write driver transistor and to switch off the second write driver transistor during a first portion of a write operation in which the write mask signal is asserted.

2. The serial read write memory of claim 1, wherein the write driver logic circuit is further configured to switch off the first write driver transistor and to maintain the second write driver transistor off during a remaining second portion of the write operation in which the write mask signal is asserted.

3. The serial read write memory of claim 2, wherein the write driver logic circuit comprises:
a first inverter configured to invert the data in signal to produce a complement data in signal;
a first logic gate configured to process the write mask signal with the complement data in signal to produce a first write mask data in signal; and
a second logic gate configured to process the write mask signal with the data in signal to produce a second write mask data in signal that is a complement of the first write mask data in signal during the write operation in which the write mask signal is not asserted and equals the first write mask data in signal during the write operation in which the write mask signal is asserted.

4. The serial read write memory of claim 3, wherein the write driver logic circuit further comprises:
a second inverter configured to invert the first write mask data in signal, the second inverter having an output terminal coupled to a gate of the first write driver transistor.

5. The serial read write memory of claim 4, further comprising:
a first complement bit line for the first column of bitcells; and
a third write driver transistor coupled between the first complement bit line and ground, wherein the write driver logic circuit further comprises a third inverter configured to invert the second write mask data in signal, the third inverter having an output terminal coupled to a gate of the third write driver transistor.

6. The serial read write memory of claim 3, wherein the first logic gate and the second logic gate each comprises a NAND gate.

7. The serial read write memory of claim 3, wherein the write driver logic circuit is further configured to process the first write mask data in signal and the second write mask data in signal to determine whether the write mask signal was asserted.

8. The serial read write memory of claim 2, wherein the write driver logic circuit is further configured to switch off the first write driver transistor and to maintain the second write driver transistor off during the remaining second portion of the write operation in response to an assertion of a write clock signal.

9. The serial read write memory of claim 1, further comprising:
a first write multiplexer transistor coupled between the first write driver transistor and the first bit line; and
a second write multiplexer transistor coupled between the second write driver transistor and the first bit line.

10. The serial read write memory of claim 9, wherein the first write multiplexer transistor and the first write driver transistor each comprises a p-type metal-oxide semiconductor (PMOS) transistor.

11. The serial read write memory of claim 9, wherein the second write multiplexer transistor and the second write driver transistor each comprises an n-type metal-oxide semiconductor (NMOS) transistor.

12. A method of operation for a serial read write memory, comprising:
performing a read operation during a first portion of a memory clock cycle;
performing a write operation to a selected column from a group of multiplexed columns during a second portion of the memory clock cycle in response to a write mask signal not being asserted;
charging a pair of bit lines in the selected column followed by floating the pair of bit lines during the second portion of the memory clock cycle in response to the write mask signal being asserted;
inverting the write mask signal to form an inverted write mask signal;
processing the inverted write mask signal with a data in signal to form a first write mask data in signal; and
processing the inverted write mask signal with a complement of the data in signal to form a second write mask data in signal, wherein performing the write operation to the selected column is responsive to the first write mask data in signal and to the second write mask data in signal.

13. The method of claim 12, further comprising:
inverting the write mask signal to form a first write driver control signal; and
controlling whether a first write driver transistor coupled between a bit line in the pair of bit lines and ground is on or off responsive to the first write driver control signal.

14. The method of claim 12, wherein floating the pair of bit lines is responsive to an assertion of write clock signal.

15. A serial read write memory, comprising:
a column of bitcells including a bit line;
a first write driver transistor configured to charge the bit line to a power supply voltage in response to an assertion of a first control signal;
a second write driver transistor configured to ground the bit line in response to an assertion of a second control signal; and
a write driver logic circuit configured to invert a data in signal to form the first control signal and the second control signal during a write operation in which a write mask is not active and to assert the first control signal and to de-assert the second control signal during a first portion of a write operation in which the write mask is active.

16. The serial read write memory of claim 15, further comprising:
a complement bit line for the column of bitcells;
a third write driver transistor configured to charge the complement bit line to a power supply voltage in response to an assertion of a third control signal; and a fourth write driver transistor configured to ground the complement bit line in response to an assertion of a fourth control signal, wherein the write driver logic circuit is further configured to form the third control signal and the fourth control signal to equal the data in signal during the write operation in which the write mask is not active.

17. The serial read write memory of claim 16, wherein the write driver logic circuit is further configured to assert the third control signal and to de-assert the fourth control signal during the first portion of the write operation in which the write mask is active.

18. The serial read write memory of claim 15, wherein the write driver logic circuit is further configured to de-assert the first control signal and the second control signal during a second portion of the write operation in which the write mask is active.

19. The serial read write memory of claim 15, wherein the first write driver transistor is a PMOS transistor and wherein the second write driver transistor is an NMOS transistor.

* * * * *